United States Patent
Amabile

(10) Patent No.: US 10,035,481 B2
(45) Date of Patent: Jul. 31, 2018

(54) METHOD AND SYSTEM FOR INDEPENDENT MANAGEMENT OF THE LIGHTING AND/OR SIGNALLING OF VEHICLES

(71) Applicant: Domenico Amabile, Salerno (IT)

(72) Inventor: Domenico Amabile, Salerno (IT)

( * ) Notice: Subject to any disclaimer, the term of this patent is extended or adjusted under 35 U.S.C. 154(b) by 357 days.

(21) Appl. No.: 14/783,080

(22) PCT Filed: Apr. 15, 2014

(86) PCT No.: PCT/EP2014/001002
§ 371 (c)(1),
(2) Date: Oct. 7, 2015

(87) PCT Pub. No.: WO2014/170010
PCT Pub. Date: Oct. 23, 2014

(65) Prior Publication Data
US 2016/0114744 A1    Apr. 28, 2016

(30) Foreign Application Priority Data

Apr. 18, 2013   (IT) .............................. MO2013A0101

(51) Int. Cl.
| | |
|---|---|
| *B60Q 1/26* | (2006.01) |
| *B60R 16/033* | (2006.01) |
| *H02J 7/00* | (2006.01) |
| *H02J 7/35* | (2006.01) |
| *B60Q 1/30* | (2006.01) |
| *B60Q 1/32* | (2006.01) |

(52) U.S. Cl.
CPC .............. *B60R 16/033* (2013.01); *B60Q 1/26* (2013.01); *B60Q 1/305* (2013.01); *B60Q 1/32* (2013.01); *H02J 7/007* (2013.01); *H02J 7/0029* (2013.01); *H02J 7/0052* (2013.01); *H02J 7/35* (2013.01); *B60Q 2900/10* (2013.01); *B60Q 2900/30* (2013.01); *H02J 2007/004* (2013.01)

(58) Field of Classification Search
None
See application file for complete search history.

(56) References Cited

U.S. PATENT DOCUMENTS

| | | | | |
|---|---|---|---|---|
| 2008/0258899 | A1* | 10/2008 | Stiles ................ | B60Q 1/305 340/471 |
| 2011/0316298 | A1* | 12/2011 | Rampersad ........... | G06Q 30/02 296/21 |

FOREIGN PATENT DOCUMENTS

| | | |
|---|---|---|
| DE | 103 42 785 A1 | 3/2005 |
| DE | 20 2007 013188 U1 | 1/2008 |
| EP | 1 621 409 A2 | 2/2006 |

* cited by examiner

*Primary Examiner* — Jared Fureman
*Assistant Examiner* — Aqeel Bukhari
(74) *Attorney, Agent, or Firm* — John Alumit

(57) ABSTRACT

The Independent lighting and signalling kit (10) is an innovative light system of semi-trailers trailers (7), campers and trucks that uses the best technologies. It is able to recover alternative energy and convert it into electric energy, accumulating it in the appropriate batteries (4), if necessary in situations that ensure road safety is improved, saving human lives. It is a system that is completely independent of the structure of the vehicle that can be installed subsequently. The disclosed device is able to improve road safety, reduce road accidents involving vehicles that collide against trailers or semitrailers parked in rest areas with poor or no visibility.

9 Claims, 4 Drawing Sheets

VEHICLES RUNNING, LIGHTING SYSTEM IS SUPPLIED COMPLETELY BY MAIN BATTERY OF TRUCK

VEHICLES SWITCHED OFF, LIGHTING SYSTEM IS SWITCHED OFF IN ORDER NOT TO RUN DOWN THE BATTERY

SEMI-TRAILER/TRAILER PARKED, LIGHTING SYSTEM OF THE SEMI-TRAILER IS COMPLETELY DISCONNECTED

METHOD AND SYSTEM FOR INDEPENDENT MANAGEMENT OF THE LIGHTING AND/OR SIGNALLING OF VEHICLES

TECHNICAL FIELD

The present invention relates to the field of lighting methods and systems and more precisely for vehicles of any type: semi-trailers, trailers, campers, trucks, etc.

The system is able to recover the mechanical energy produced, for example from the tractor, from the moving vehicle, and convert the energy into electric energy, accumulating the energy in the suitable batteries.

The system disclosed here is completely independent of the structure of the vehicle and the kit thereof can be subsequently mounted and installed parallel to the lighting system that is already present in the vehicle.

BACKGROUND ART

Currently the lighting or signalling system: trailers, semi-trailers, is supplied by the general system of the tractor of the vehicle (tractor) through a male/female connecting plug, this connection is obligatory because only the tractor has the electric energy to permit operation both at night and day of the lighting devices used on the vehicle.

Usually, in the case of long waits, the signalling lights or position of the entire articulated truck (tractor with trailer) are switched off because if they were kept on and with the engine switched off the battery would run down in a short period of time, compromising the function of the vehicle; whereas in the case of a switched-on engine, fuel would be consumed and a contribution to the emission of environmental pollutants would be obtained unnecessarily.

Disclosure and Advantages of the Invention

The aim of the present invention is to solve the aforesaid drawbacks by providing the prior art with a method and system in a kit that is suitable for solving the problem of the lack of lighting of articulated trucks with trailers and semi-trailers and the case in which the trailer or semi-truck is totally disconnected from the truck.

Another object of the present invention is to solve the problem of the lack of lighting of the vehicle when it is stationary, for example in unlit lay-bys, near bends, whilst waiting to be loaded/unloaded etc, without using the system already present in the vehicle.

A further object is to make the system work that is disclosed here by recovering the mechanical energy produced by the vehicle moving and converting the mechanical energy into electrical energy to be accumulated, if it is not required, into batteries.

Amongst the advantages, it must be stated that:
the claimed system is completely independent of the structure of the vehicle and the kit thereof can be mounted subsequently and installed parallel to the lighting system that is already present in the vehicle;
the system of the vehicle is not affected;
a significant contribution is given to saving human lives because the system always works in the vehicles, especially when it is stationary.

Such objects and advantages are all reached by the kit for independent lighting or signalling that is applicable to vehicles and operates with mechanical energy produced by said vehicle that is the object of the invention that is characterised by what is set out in the claims below.

BRIEF DESCRIPTION OF DRAWINGS

This and further characteristics of the invention will be better highlighted in the following description of some embodiments thereof, illustrated, in the form of a non-limiting example, with the help of accompanying drawings.

DESCRIPTION OF THE INVENTION

Figure 1:
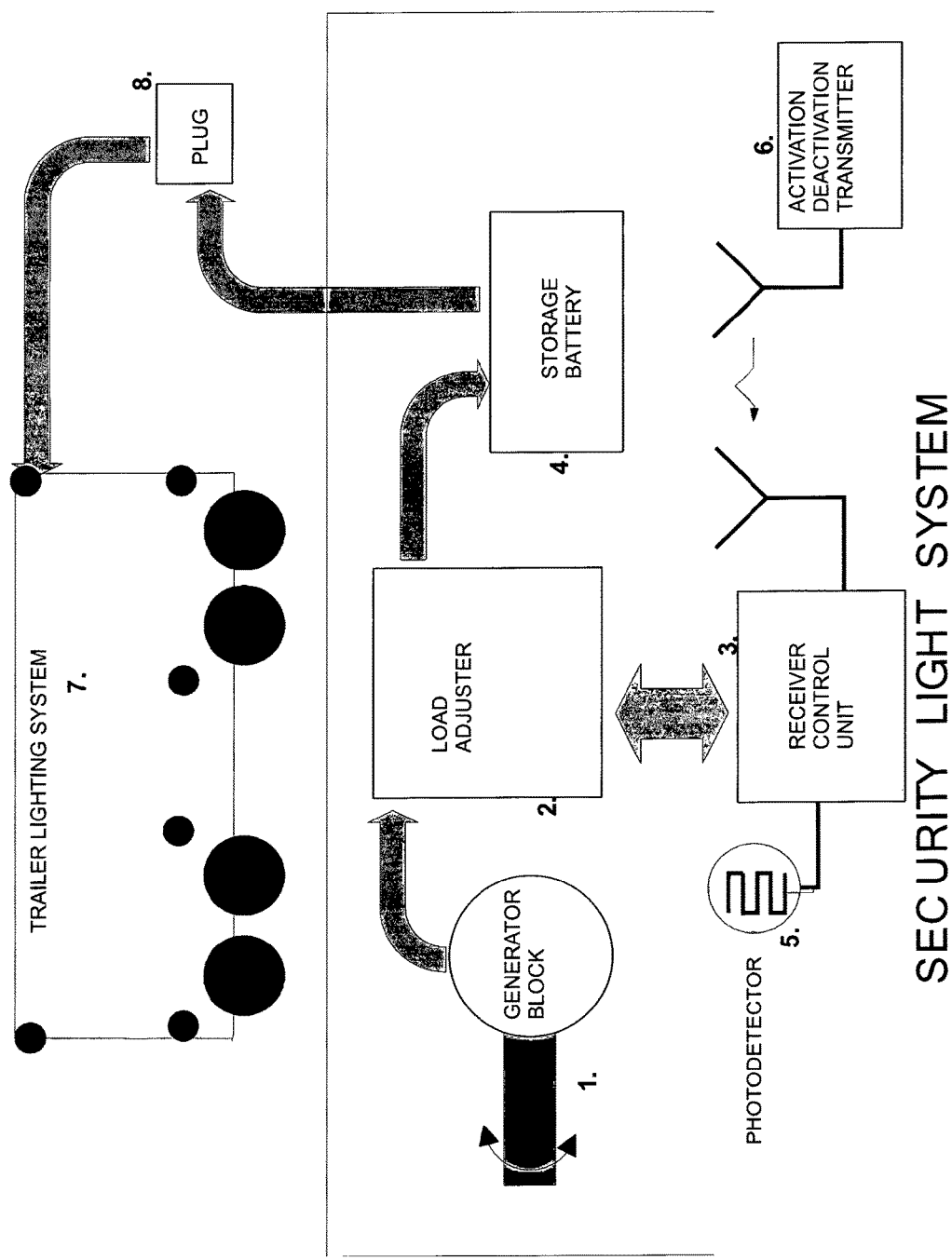
FIG. 1: the operating diagram of the independent system of lighting or signalling that is applicable to vehicles that is the object of the invention.
Figure 2:
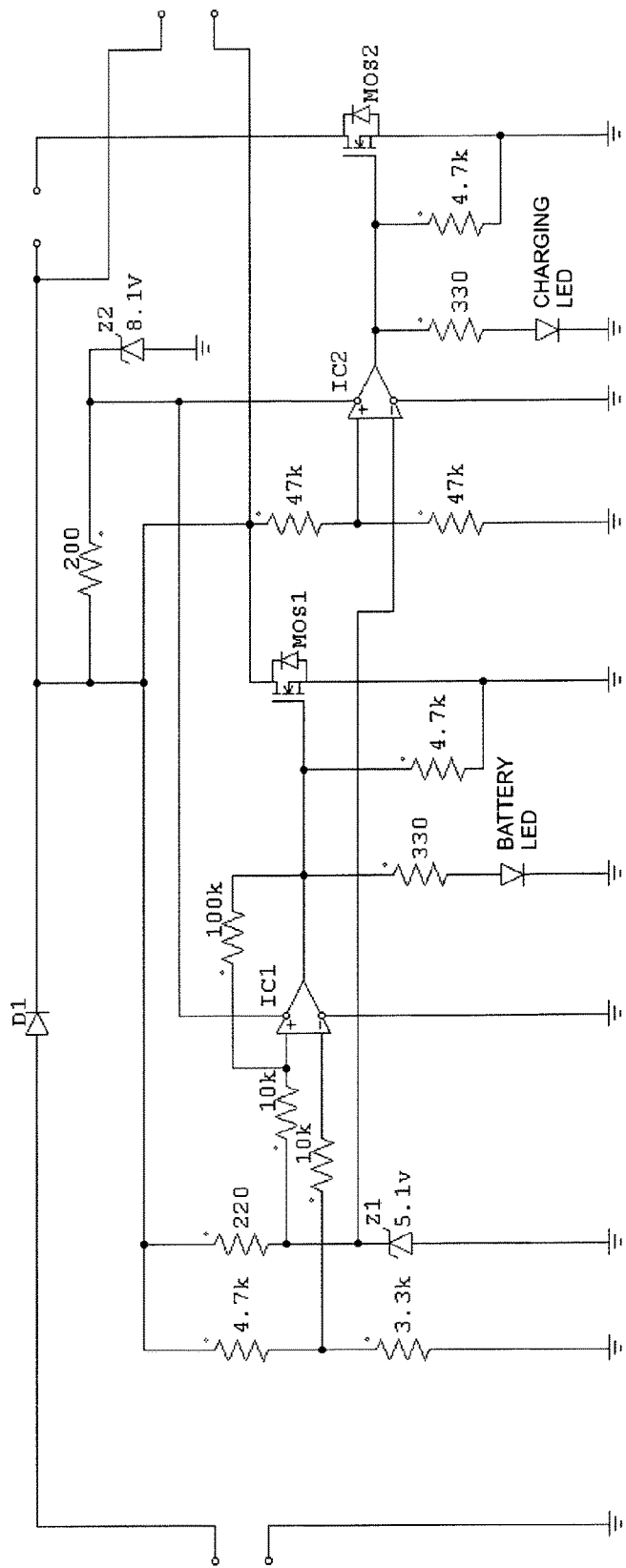
FIG. 2: this illustrates the circuit diagram that manages the electric energy produced by the generator.
Figure 3:
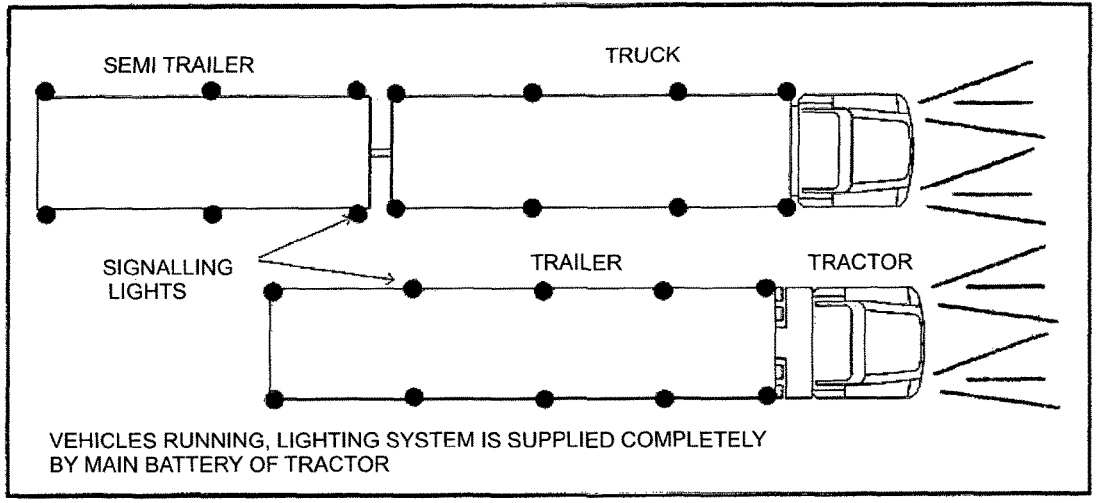
FIG. 3: this illustrates the advantage that is obtainable from the independent kit, once it has been applied to the vehicle.
Figure 3:
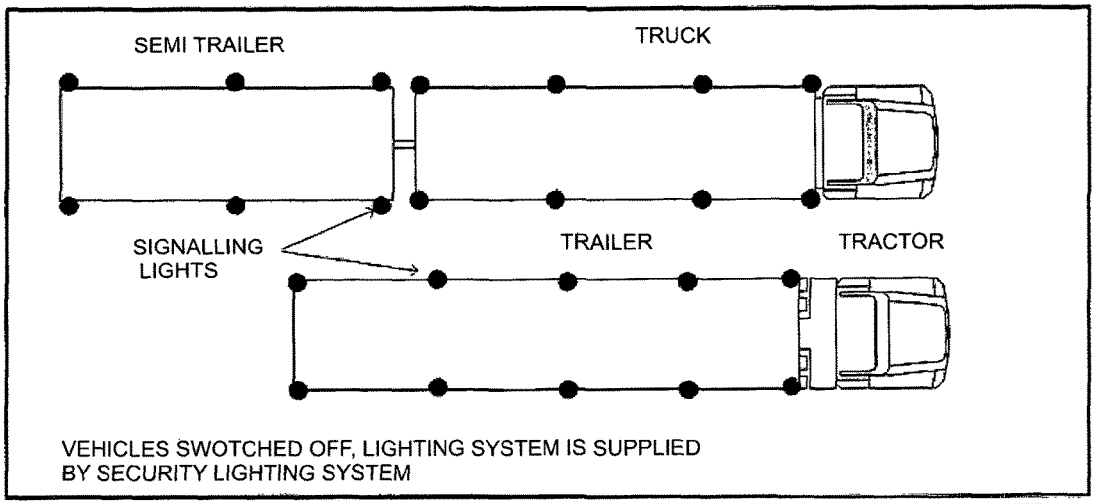
Figure 3:
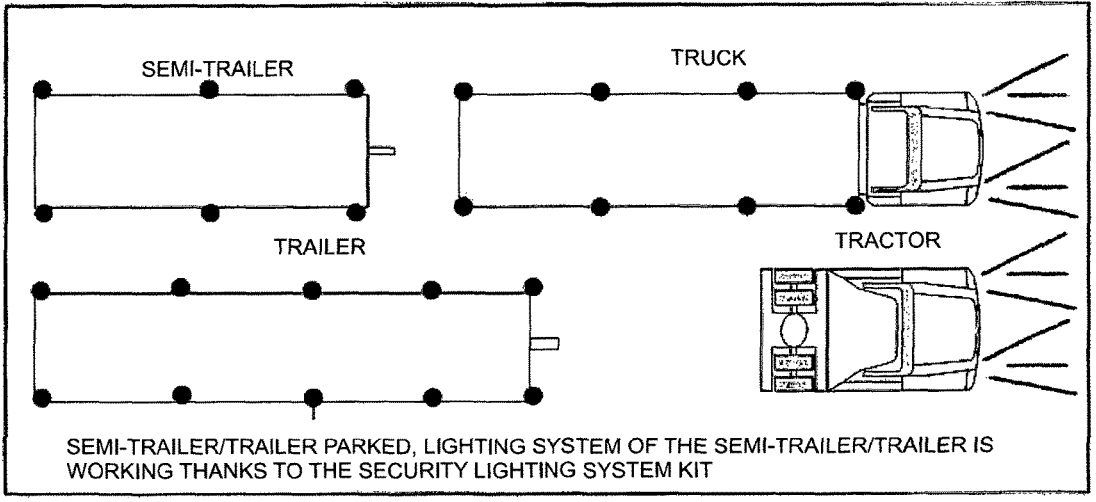
Figure 4:
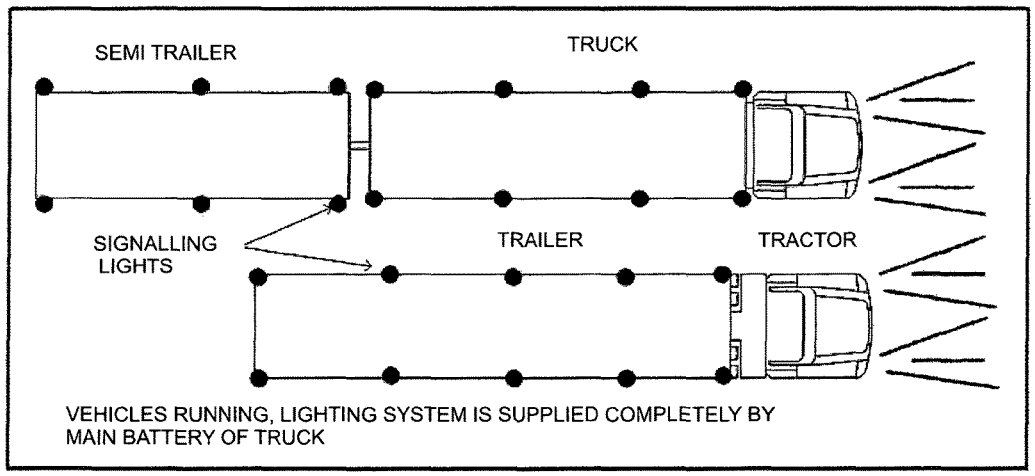
FIG. 4: this illustrates the prior art of the vehicles devoid of an independent kit in object.
Figure 4:
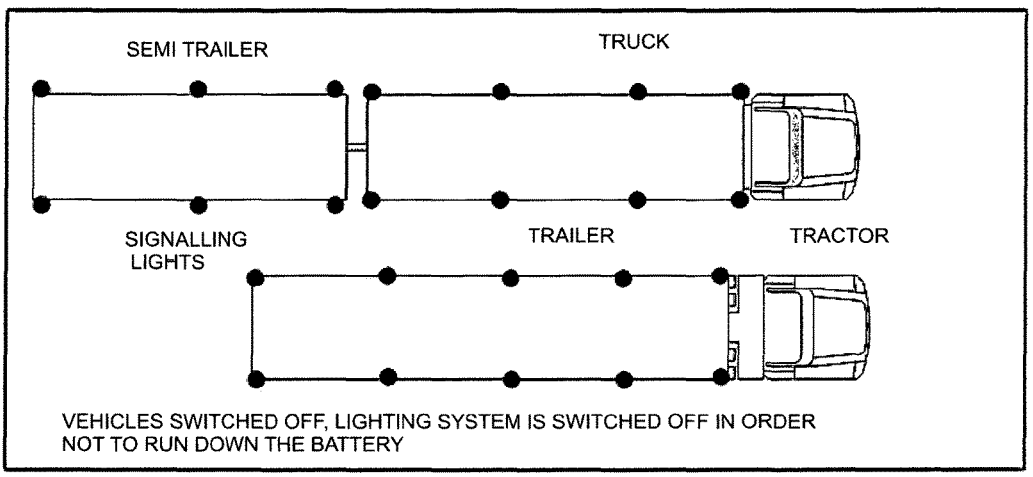
Figure 4:
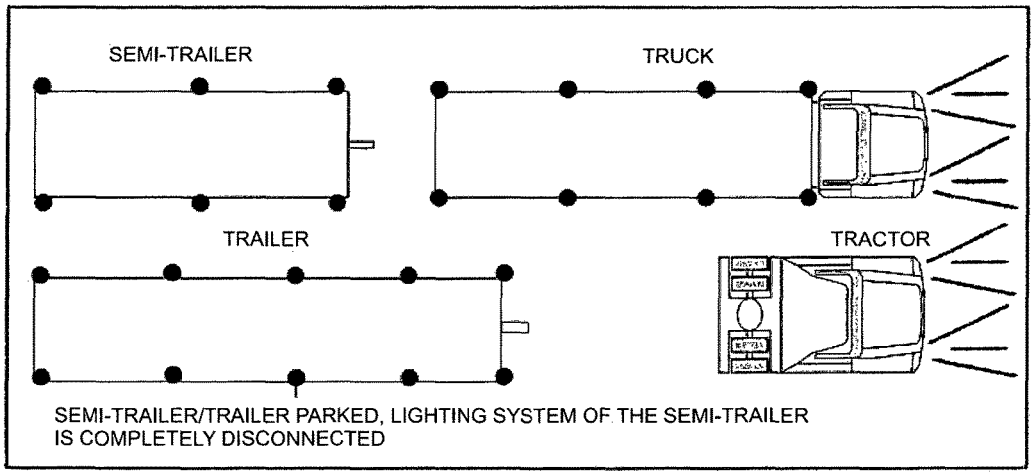

With particular reference to the figures, with 10 the overall kit is indicated for independent lighting of a vehicle. Nevertheless, the invention disclosed here is applicable to any type of vehicle such as semi-trailers, trailers, campers, trucks, etc.

The kit 10 in question mainly consists of at least:
a generating system 1,
a converter circuit or charge adjuster 2,
a control unit 3,
a battery pack 4,
a photoelectric sensor 5,
a transmitter/receiver 6,
a connecting plug 8.

With 7, the lighting system of the vehicle is illustrated overall. Although it is not part of the kit in question, it is also depicted because it is indispensable for operation. It is already present on the vehicle.

The generating system can be of two types:
the first type consists of an electric generator with a suitable reduction gear and mechanical supports connected mechanically to the axle of the trailer/semi-trailer in a structurally non-invasive manner, creating a system that is able to recover mechanical energy and convert it into electric energy.
The second type consists of photovoltaic cells installed on a suitable photovoltaic cells installed on a suitable shelf supporting the photovoltaic cells in the upper zone of the semi-trailer so as not to take up space, generating electric energy from solar radiation.

The choice of generation system to be applied is substantially connected to the type of trailer and semi-trailer under consideration.

With 2 the converter circuit or load adjuster is indicated; this is used to adjust the dispensed current of the generator so as to make the current suitable for the field of use of the battery, when MOSFET 1 is running, the battery charges whereas when MOSFET 2 is running, the battery supplies the charge.

MOSFET1 is driven by a comparator that ensures that the battery is protected from overcharge, whereas the drive signal of MOSFET2 protects the battery, preventing the battery becoming completely exhausted; this operation enables optimum battery performance and greater lifetime to be obtained. The signals managing the adjusting circuit are managed by the control circuit.

With 3, the control circuit is indicated, which is based on a microprocessor that is able to manage in an optimum manner the entire system, battery charging discharging, when to supply the charge, managing the various signals, etc.

With 4 one or more batteries or energy storage batteries are indicated: said battery pack will be able to supply the load for a long time, up to 48 h considering that almost all the semi-trailers or trailers are provided with LED signalling (thus with very low energy consumption, duration is much longer in the absence of generation).

With 5 the presence of a photodetector is observed that is suitable for reporting to the control unit whether the vehicle is in a zone with or without light.

With 6 a transmitter/remote control for activating and/or deactivating the system if it is voluntarily desired to keep the parked vehicle non lighted.

Lastly, 8 indicates a connecting plug.

The plug 8 ensures the flow of current from the tractor to the trailer/semi-trailer when the tractor is operating and if the tractor is switched off, ensures the flow of current from the kit in question to the lighting system of the trailer but never ensures the flow of current from the tractor to the kit because the latter is totally independent and above all does not influence the electrical operation of the truck.

The invention claimed is:

1. A lighting and signaling kit (10) for a lighting system of semi-trailers, trailers, campers, and trucks to recover alternative energy and convert said energy into electric energy, accumulating the electric energy in batteries to make said electric energy available when needed to ensure improved road safety, characterized in that the kit comprises at least:
   a. a generation system (1) connected to a trailer or semi-trailer,
   b. a converter circuit or load adjuster (2) connected to the generation system for adjusting currents of the generation system,
   c. a control unit (3) in communication with the converter circuit or load adjuster for managing the signaling system,
   d. a battery pack (4) connected to the load adjuster,
   e. a photoelectric sensor (5) connected to the control unit,
   f. a transmitter/receiver (6) that communicates with the control unit, and
   g. a connecting plug (8) that provides a flow of current from a tractor to the trailer or semi-trailer when the tractor is operating, and provides a flow of current from the battery pack to the lighting system of semi-trailers, trailers, campers, and trucks when the tractor is not operating.

2. The kit according to claim 1, characterized in that said generating system (1) consists of an electric generator with a reduction gear and mechanical supports connected mechanically to an axle of the semi-trailer, trailer, camper, or truck, creating a system that is capable of recovering mechanical energy and converting the mechanical energy into electric energy.

3. The kit according to claim 1, characterized in that said generating system (1) consists of photovoltaic cells that are installable in an upper zone of a semi-trailer, trailer, camper, or truck, generating electric energy from the solar energy.

4. The kit according to claim 1, characterized in that said converter circuit or load adjuster (2) adjusts the currents dispensed by the generation system so as to make the currents suitable for the field of use of the battery pack; particularly when the MOSFET MOS1 runs, the battery pack charges whereas when MOSFET MOS2 runs, the battery pack supplies a charge; MOSFET MOS1 is driven by a comparator that ensures protection against battery overcharge whereas a control signal of MOSFET MOS2 protects the battery pack, preventing said battery pack from draining.

5. The kit according to claim 1 or 4, characterized in that the control circuit (3) is a microprocessor that is able to manage battery charging and discharging, the time for supplying a charge, and what signals to send.

6. The kit according to claim 1, characterized in that the battery pack consists of at least one battery or energy storage battery.

7. The kit according to claim 1, characterized in that the photoelectric sensor (5) reports to the control unit whether the vehicle is in a zone with or without light.

8. The kit according to claim 1, characterized in that the transmitter/remote control (6) activates and/or deactivates the kit.

9. Method for lighting vehicles, the vehicle comprising the kit (10) according to claim 1, characterized in that:
   a. said kit recovers mechanical energy from a moving vehicle and converts said mechanical energy into electric energy stored in a battery pack;
   b. Said mechanical energy is converted by a converter circuit or load adjuster (2) that adjusts currents dispensed by the generation system so as to make the current suitable for the field of use of the battery pack; particularly, when MOSFET MOS1 is running, the battery pack charges whereas when MOSFET MOS2 is running, the battery pack supplies the charge; said MOSFET MOS 1 being driven by a comparator that ensures protection against battery pack overcharge, whereas a monitoring signal of MOSFET MOS2 protects the battery pack from draining; and
   c. the control unit manages signals from the converter circuit or load adjuster.

* * * * *